United States Patent [19]
Bock et al.

[11] Patent Number: 5,690,762
[45] Date of Patent: Nov. 25, 1997

[54] EMERGENCY RING FOR A VEHICLE WHEEL

[75] Inventors: Andreas Bock; Martin Kunz; Horst Binder, all of Munich, Germany

[73] Assignee: Bayerische Moteren Werke Aktiengesellschaft, Germany

[21] Appl. No.: 492,111

[22] PCT Filed: Jan. 27, 1994

[86] PCT No.: PCT/EP94/00231

§ 371 Date: Aug. 10, 1995

§ 102(e) Date: Aug. 10, 1995

[87] PCT Pub. No.: WO94/18016

PCT Pub. Date: Aug. 18, 1994

[30] Foreign Application Priority Data

Feb. 10, 1993 [DE] Germany .................. 43 03 922.7

[51] Int. Cl.$^6$ .................................. B60C 17/06
[52] U.S. Cl. ......................... 152/520; 152/158
[58] Field of Search ........................ 152/157, 158, 152/516, 520

[56] References Cited

U.S. PATENT DOCUMENTS

| | | | |
|---|---|---|---|
| 3,814,158 | 6/1974 | Ryder | 152/158 |
| 3,872,907 | 3/1975 | Curtiss, Jr., et al. | 152/158 |
| 4,212,338 | 7/1980 | Tiemann | 152/520 X |
| 4,295,509 | 10/1981 | Stein | 152/520 X |
| 4,573,509 | 3/1986 | Smith et al. | 152/158 |

FOREIGN PATENT DOCUMENTS

| | | |
|---|---|---|
| 0 142 844 A3 | 5/1985 | European Pat. Off. . |
| 2 085 827 | 12/1971 | France . |
| 2 391 086 | 12/1978 | France . |
| 27 22 885 | 11/1978 | Germany . |
| 28 51 187 | 6/1980 | Germany . |
| 33 41 969 | 5/1985 | Germany . |
| 83 25 913 | 11/1985 | Germany . |
| 84 32 017.6 | 3/1987 | Germany . |
| 36 34 459 A1 | 4/1987 | Germany . |
| 36 26 012 | 2/1988 | Germany . |
| 37 20 706 A1 | 1/1989 | Germany . |

*Primary Examiner*—Michael W. Ball
*Assistant Examiner*—Francis J. Lorin
*Attorney, Agent, or Firm*—Evenson, McKeown, Edwards & Lenahan, P.L.L.C.

[57] ABSTRACT

An emergency ring of elastic material for a vehicle wheel having a one-piece deep bed rim comprises a one-piece annular support body, which via support rings are supported exclusively on the rim bed of the wheel and is spaced apart from at least one side wall region or of a pneumatic tire. Reinforcement inlays are disposed radially such that there is only relatively little compressible elastic material within the reinforcement inlays. High security against rotation of the emergency ring relative to the rim is thereby assured. Moreover, the emergency ring is easily mounted and provides great security against a tire being thrown off, even when cornering with tires with low air pressure.

18 Claims, 4 Drawing Sheets

EMERGENCY RING FOR A VEHICLE WHEEL

BACKGROUND AND SUMMARY OF THE INVENTION

The present invention relates to an emergency ring for a vehicle wheel, and more particularly, to an emergency ring which is composed of a one-piece rim with a rim bed and a pneumatic tire, comprising a one-piece annular elastic body having annular reinforcement inlays and an outside on which, in an emergency, an inside of the pneumatic tire remote from tire tread comes to rest, an outer side face, an inner side face, and an inside oriented toward the rim bed.

U.S. Pat. No. 3,814,158 discloses an emergency ring which, on its inside in the middle, has an encompassing annular recess. This recess divides the known emergency ring into two halves on the side toward the rim bed. Each half rests on the pneumatic tire in the region of the tire bead.

Because the emergency ring rests on both sides on the tire beads, it must be resilient enough in the middle region as a result of the recess to enable mounting of the pneumatic tire. The softness of the emergency ring required for mounting has a disadvantageous effect upon rotation of the vehicle wheel, especially so at high wheel speeds, as a result of the emergency ring becoming unstable and expanding in the radial direction. The reinforcement inlays, which for reasons of mountability are located relatively far to the outside, are unable to prevent expansion of the farther inward elastic material of the emergency ring.

A danger therefore exists that the known emergency ring in normal operation (that is, with adequate operating pressure in the pneumatic tire) will move relative to the rim, causing wear and an increase in temperature and in particular also producing an imbalance. In emergency operation, the emergency ring is too unstable to transmit the tire contact force purposefully to the region of the tire beads and thereby keeping the pneumatic tire on the rim. Instead, the two annular halves of the emergency ring creep toward the middle in the direction of the recess and fix the tire beads only inadequately.

An emergency ring that is supported on the rim bed is described in DE-OS 27 22 885, wherein the emergency ring simultaneously rests nonpositively in the lower region of the side walls of the pneumatic tire. As a result, the initial stress in the radial direction that can be brought to bear is sharply limited, because the combined emergency ring and pneumatic tire must remain mountable. Reinforcement inlays to prevent expansion of the emergency ring under centrifugal force are entirely lacking.

The protrusion from the emergency ring provides no security against axial displacement, because the protrusion in the mounted state of the emergency ring is supported on the shallow rim bed.

The emergency ring shown in DE 84 32 017 U1 is also supported both on the pneumatic tire and on the rim bed. The relatively thin-walled shape of this emergency ring, while it does facilitate mounting, is capable neither of bringing an adequate radial initial stress to bear, nor of securely transmitting the wheel load in an emergency.

The emergency ring described in DE 33 41 969 A1 is firmly joined to the rim bed, for instance by welding or screw fastening. Because of its lack of elasticity (steel emergency ring) and the rigid disposition on the vehicle wheel, its rigid construction requires a correspondingly large spacing from the wheel flanges of the wheel on both sides, to assure mountability of the pneumatic tire.

U.S. Pat. No. 3,872,907 also shows in FIG. 10 a one-piece emergency ring which extends closely spaced apart from the adjacent side wall regions of the pneumatic tire. This emergency ring is, however, designed for rims that are in two or more parts and is not strictly supported on the rim bed, but is instead secured to the rim. It also contemplates split emergency rings for one-piece rims (FIGS. 11 and 13), with the ring halves being held in their position via tension arms actuatable by cable pulls.

It is, therefore, an object of the present invention to provide an emergency ring such that, in addition to easy mountability, it is seated firmly on the vehicle wheel and, in an emergency, fixes the pneumatic tire to the rim.

This object has been achieved in accordance with the present invention by providing that the inside of the emergency ring is supported by at least a part of a surface thereof on the rim bed, and at least one of the outer and inner side faces is spaced apart from an adjacent side wall region of the pneumatic tire.

One core concept of the present invention is to configure the emergency ring such that, in the unloaded state, it is supported solely on the rim bed. As a result, it is possible to generate a suitably high initial stress in the radial direction so that the emergency ring will not rotate relative to the rim. Because of the deep bed and the elastic deformability of the emergency ring, its mountability remains assured. Spacing between at least one side face of the emergency ring and the pneumatic tire is necessary in order to assure that the emergency ring will be supported only on the rim bed. This spacing also makes the pneumatic tire easier to mount.

By the advantageous embodiment of the present invention, the emergency ring is also fixed in the axial direction, at least to one side. This positive engagement by the deep bed is significant especially in tires that are low in air and at the same time are cornering, or in other words when side forces arise.

Annular bearing regions, protruding in beadlike fashion, according to the present invention facilitate the mounting of the emergency ring. Because of their slight widthwise length, these bearing regions are relatively compressible, and the clearance between the bearing regions also serves to receive the compressed elastic material. Moreover, the clearance facilitates mounting, inasmuch as the emergency ring can be pulled on in two steps. The concentration of mass outside the bearing regions, conversely, represents a solid support body that is also rigid in response to shear forces, and that changes its shape only slightly even under the influence of transverse force.

The geometry of the emergency ring according to the present invention assures a secure hold of the pneumatic tire on the rim: The laterally bulging form of the emergency ring creates butting surfaces that make it more difficult for the pneumatic tire to pull away when cornering and when the tire is low in air. Because the contour of the emergency ring, at least on one side, preferably the deep bed side, follows the contour of the pneumatic tire, the result is a "positive spaced-apart engagement" that prevents the tire beads from slipping out.

In contrast to the widthwise length of the emergency ring known from above-discussed DE 33 41 969 A1, however, it suffices in the present invention to provide, for the sake of mountability of the pneumatic tire, a spacing $d_{aH}$ on an order of magnitude of somewhat less than the single tire bead thickness, since within certain limits the emergency ring is elastically deformable and axially displaceable on the rim.

The total width of the emergency ring should be chosen such that the side walls of the pneumatic tire in an emergency, even while cornering, will necessarily, by contact with the emergency ring, be slightly tilted outward or vertically, but cannot escape obliquely inward, because that would cause the pneumatic tire to begin to pull off. In an emergency, that is when there is no pressure in the pneumatic tire, the side regions of the emergency ring are additionally shifted somewhat outward as a result of the compression from the wheel load. As a result, the spacing between the emergency ring and the pneumatic tire decreases even more, and the emergency ring and tire bead region may come into contact under some circumstances, so that the tire beads cannot be pulled from the rim shoulders. That is, the small spacings $d_a$ and $d_{aH}$ prevent the beads from slipping into the deep bed, which would entail the dangerous throwing off of a tire.

An emergency ring dimensioned in accordance with the present invention prevents the outward-bulging side walls of the pneumatic tire will overlap one another on their insides. As a result, excessive wear and corresponding tire heating are averted.

The characteristic of the present invention in which a diameter of the reinforcement inlays is only slightly greater than a wheel flange diameter advantageously meets two fundamental demands made of emergency rings. First, the diameter of the reinforcement inlays must be only small enough that the emergency ring remains mountable. Second, the quantity of elastic material inside the reinforcement inlays must be kept small, in order to assure a suitably high initial stress on the rim bed and thus only slight expansion in response to centrifugal force. In other words, a firm seat of the emergency ring is guaranteed even at high speeds.

One advantageous embodiment of the present invention makes it easier to balance the unit comprising the wheel, pneumatic tire, and emergency ring, on a balancing machine.

Positive-engagement-generating features in accordance with the present invention, for instance in the form of indentations and protrusions, are known per se from DE 36 34 459 A1 and prevent rotation of the emergency ring on the rim even under extreme conditions. Such conditions prevail for instance if vehicle wheels are configured for very high speeds, because the effect of centrifugal force causes corresponding expansion of the emergency ring. Extreme inertia forces, such as wheels spinning on ice or wheels that lock during hard braking, can cause rotation of the emergency ring on the rim. The positive-engagement-generating features reliably prevent this rotation; excessive wear, high temperatures and imbalance of the wheel that was originally fully balanced are avoided in this way.

A further advantageous feature of the present invention prevents axial creepage of the emergency ring on the rim. The axial fixation can be prevented for instance by a low hump or by bumps disposed on the rim bed. If the emergency ring is constructed such that the inside of the emergency ring is supported by at least a portion of a surface thereof in the deep bed of the rim, the axial fixation is then required in only one direction.

Recesses have been found to facilitate relative motions between the outside of the emergency ring and the inside of the pneumatic tire that necessarily occur as a result of the different diameters. Moreover, the weight of the emergency ring is reduced as a result of the recesses (in the form of V-shaped notches, for instance), and mounting is made easier by the improved deformability in the radial direction. Moreover, because of the rolling uniformities resulting from the recessing, an emergency that has occurred becomes immediately apparent to the occupants of the vehicle.

BRIEF DESCRIPTION OF THE DRAWINGS

These and other objects, features and advantages of the present invention will become more readily apparent from the following detailed description thereof when taken in conjunction with the accompanying drawings wherein.

DESCRIPTION OF THE DRAWINGS

Figure 1:
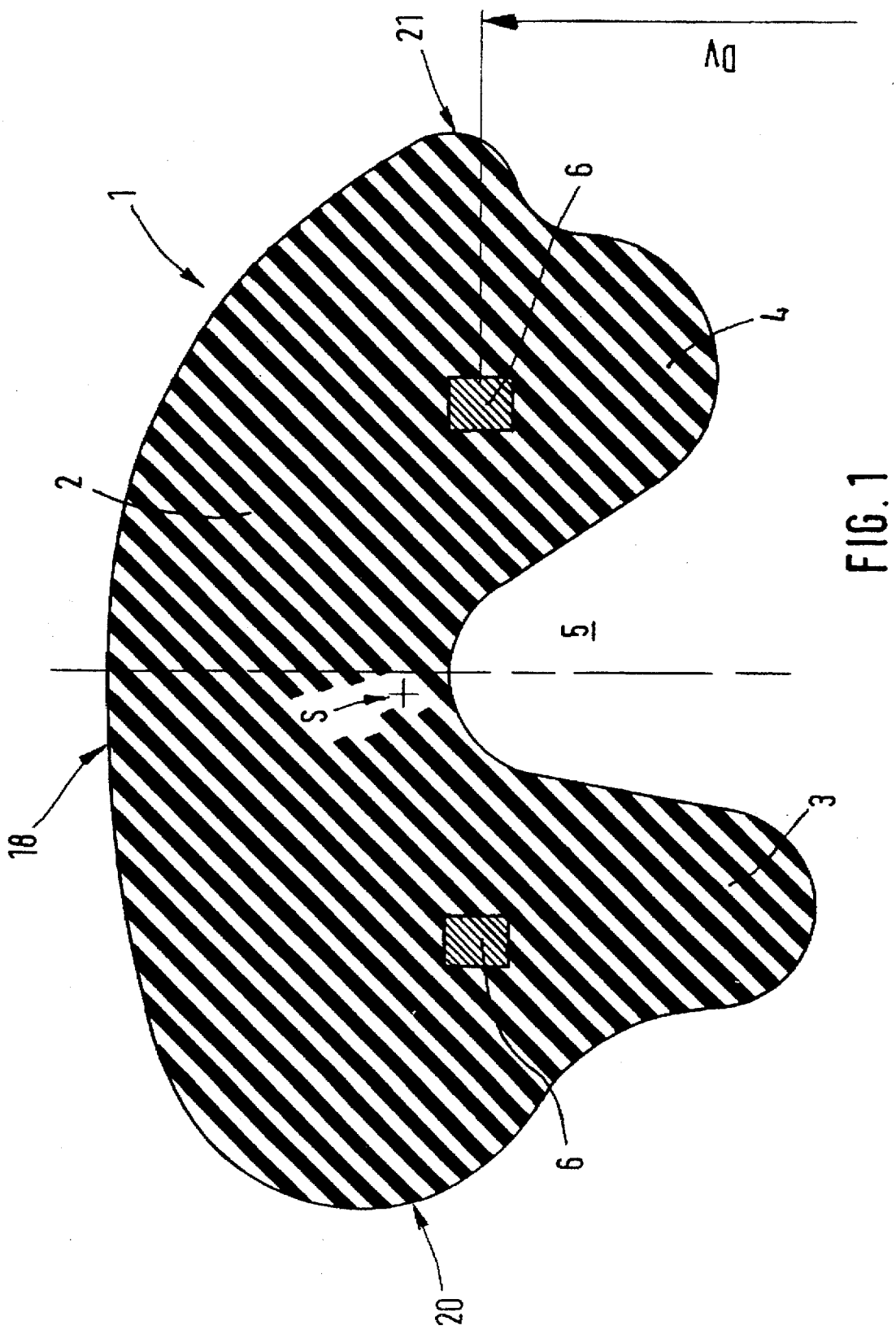
FIG. 1 is a cross-sectional view of emergency ring in an unmounted state according to the present invention.
Figure 2:
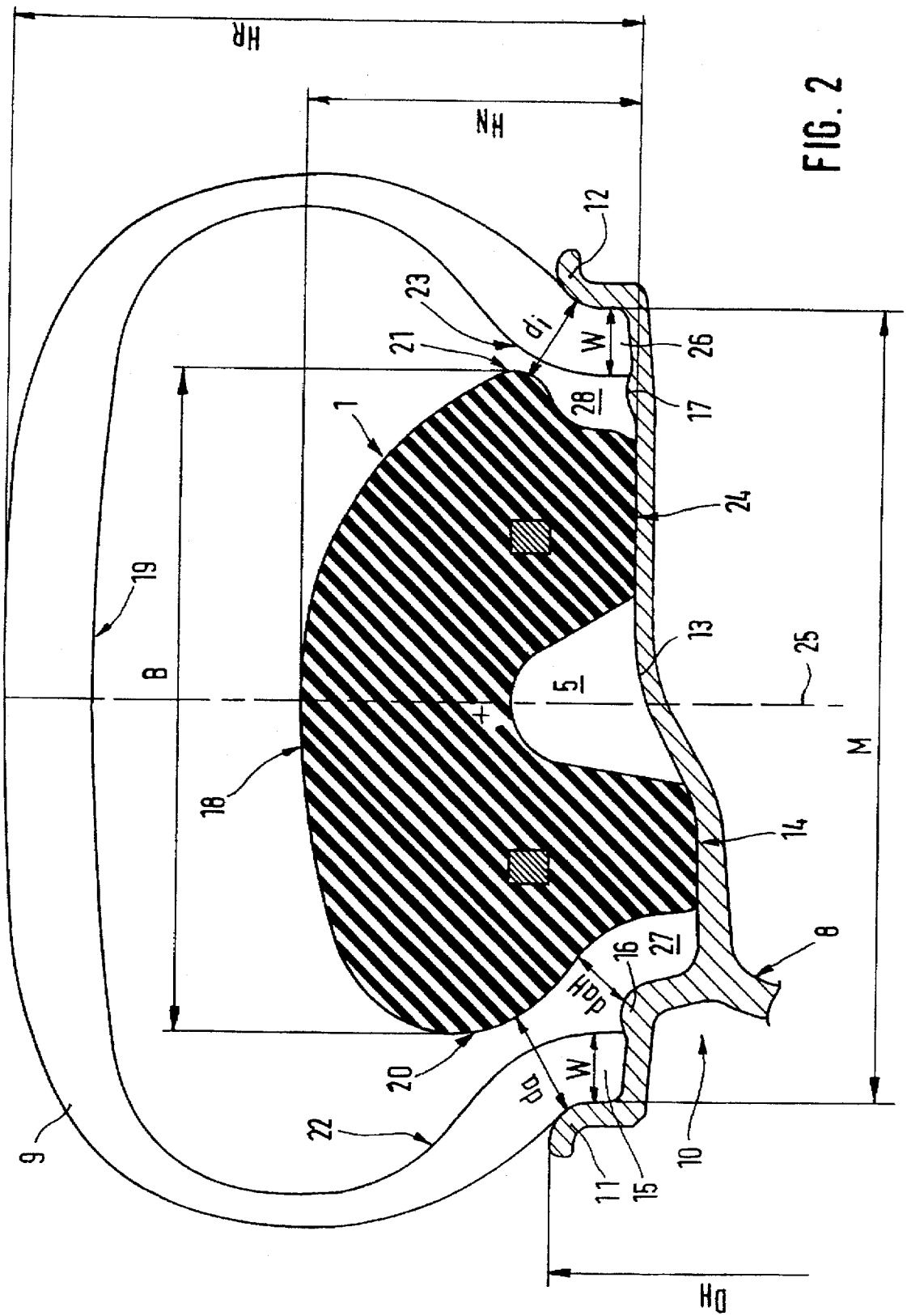
FIG. 2 shows a view corresponding to FIG. 1 of the emergency ring but mounted on a pneumatic tire wheel.

FIGS. 1 and 2 show an emergency ring designated generally by numeral 1 in the unmounted and mounted state, respectively. For the sake of simplicity, the edges located outside the sectional plane have not been shown in either case.

The emergency ring 1 is a one-piece body made of an elastic material having a relatively high modulus of elasticity and is composed of a solid support body 2 and an outer and inner support ring 3 and 4, respectively. An encompassing recess 5 is located between the two support rings 3 and 4. At the transitions between the two support rings 3 and 4 and the support body 2, annular reinforcement inlays 6 are inserted, composed for instance of individual steel wires.

FIG. 2 shows a vehicle wheel 8 with a pneumatic tire 9 mounted thereon and with an emergency ring 1. The wheel 8 has a one-piece deep bed rim 10 with an outer and an inner wheel flange 11 and 12, respectively. The deep bed 14 of the rim bed 13 is located on the outside of the rim 10. The tire beads 15 and 26 are held on the rim 10 between the wheel flanges 11, 12 and an outer and inner hump 16 and 17, respectively, on the rim shoulders.

The outside 18 of the emergency ring 1 is located facing the inside 19 of the tire remote from the tread of the pneumatic tire 9. Outer and inner side faces 20 and 21, respectively, of the emergency ring 1 are curved in convex fashion and in their contour are curved similarly to the adjacent outer and inner side wall regions 22 and 23, respectively, of the pneumatic tire 9.

A firm seat on the rim 10 is assured by the reinforcement inlays 6, whose diameter $D_v$ is only slightly greater than the wheel flange diameter $D_H$. In this way it is attained that even at high wheel speeds, the expansion of the emergency ring 1 is slight, and the partial masses of the emergency ring 1 disposed inside the reinforcement inlays 6 still exert an adequate initial stress upon the rim 10 to assure a seat where relative rotation is prevented.

The outer and inner spacings $d_a$ and $d_i$ between the emergency ring 1 and the applicable wheel flanges 11 and 12 is so slight that in an emergency, in other words when the faces 18 and 19 rest on one another, as a result of the deformation of the support body 2 a contact also comes about between the emergency ring 1 and the respective side wall regions 22 and 23. This prevents the tire beads 15 and 26 from departing from their position shown in FIG. 2.

In another critical driving situation as well, namely cornering with tires 9 that have low air pressure, the combination of the wheel 8 and pneumatic tire 9 remains fully functional, because the convexly curved side faces 20 and 21 of the emergency ring 1 prevent the pneumatic tire 9 from being pulled off the rim 10.

The slight spacing $d_a$ and $d_i$ is no hindrance to mountability of the pneumatic tire 9 on the rim 10, inasmuch as the emergency ring 1 is axially displaceable in the rim bed 13 during mounting. As a result, the width B of the emergency ring 1 can be chosen to be greater than the difference between the rim opening width M and twice the tire bead thickness W.

The spacing $d_{aH}$ between the outer side face 20 of the emergency ring 1 and the region of the outer hump 16 is ideally somewhat less than the width W of the outer tire bead 15. As a result, mounting of the pneumatic tire 9, in which the outer tire bead 15 plunges into the free annular space 27 of the deep bed 14, is still readily possible as a result of elastic deformation of the support ring 3. In an emergency, the emergency ring 1 is deformed by compression enough that the spacing $d_{aH}$ is decreased to an extent that prevents slippage of the bead 15 into the deep bed 14 and that thus keeps the pneumatic tire 9 on the rim 10.

On the inside of the emergency ring 1 also, a free annular space 28 is provided, which takes into account the circumstance that the inner bead 26 during mounting of the pneumatic tire 9 is first located inside the inner hump 17 and not until the end presses against the wheel flange 12 by imposition of overpressure on the interior of the pneumatic tire 9.

The height $H_N$ of the mounted, unloaded emergency ring 1, as measured between the high bed 24 and the outside 18 is approximately equivalent to half the tire height $H_R$. The center of gravity S of the emergency ring is ideally located near the center plane 25 of the rim 10, thereby making balancing easier, and in the region of the diameter $D_V$, thus minimizing the expansion caused by centrifugal force.

Figure 3:
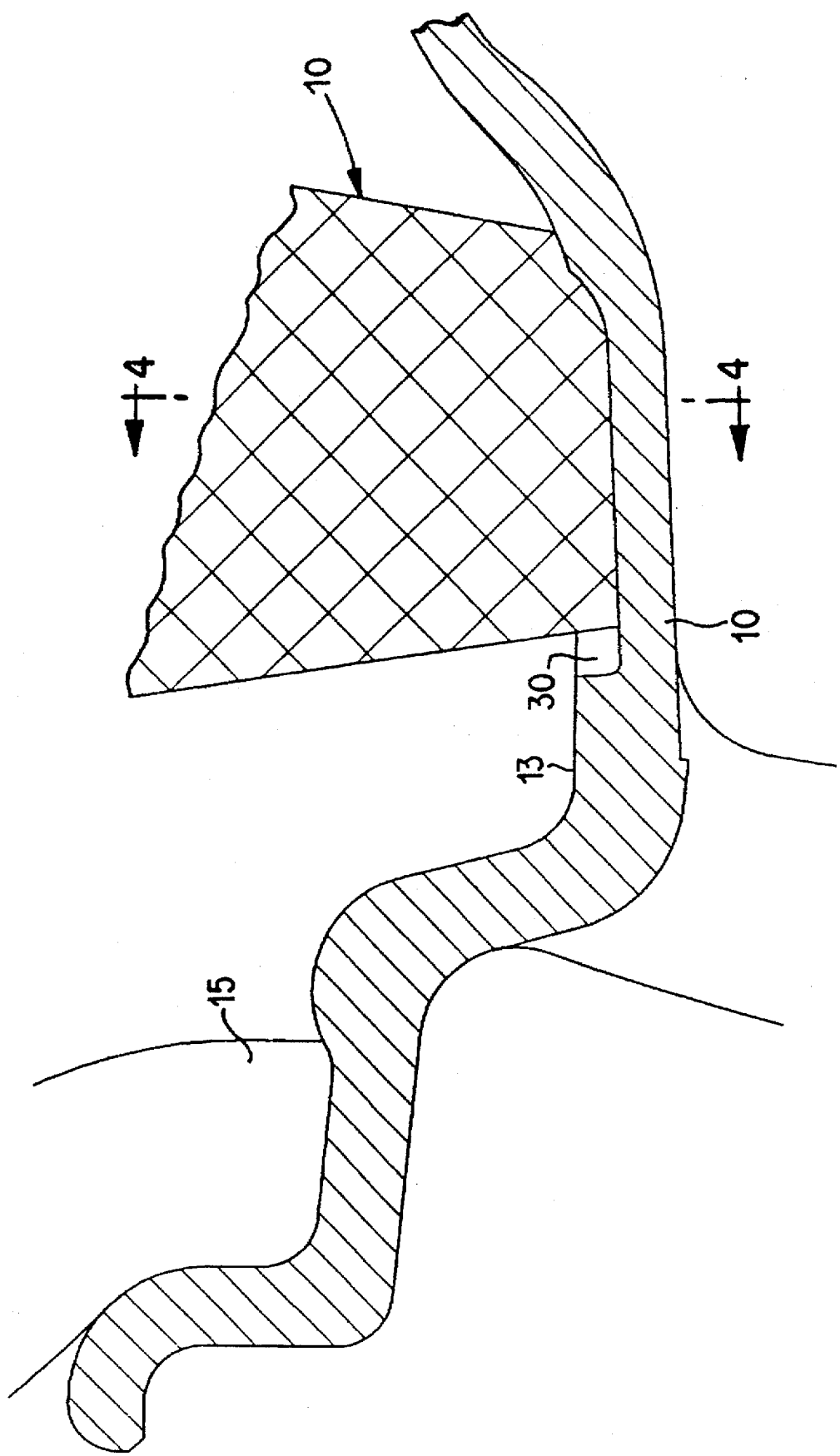
FIG. 3 is a partial cross-sectional view of the emergency ring showing positive engagement in the axial direction with respect to the bed of the rim.
Figure 4:
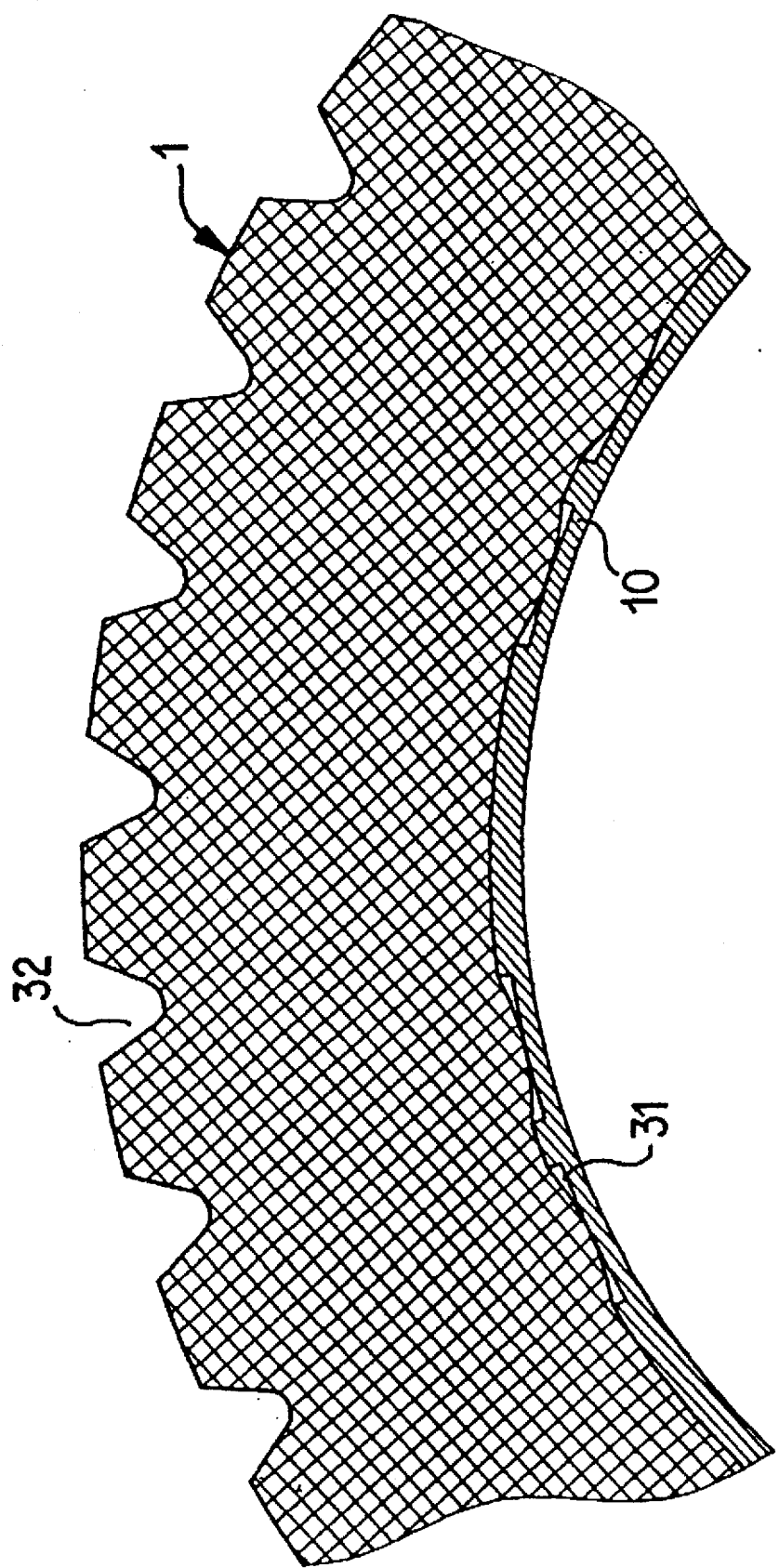
FIG. 4 is a cross-sectional view taken along line A-A of FIG. 3 showing how the emergency ring generates positive engagement in the circumferential direction and a plurality of recesses distributed over the emergency ring circumference in a direction transverse to its circumferential direction.

As shown in FIGS. 3 and 4, the bed 13 of the rim 10 is configured with a positive engagement portion 30 in the axial direction of the emergency ring 1 at least intermittently in the circumferential direction of the rim 10. The rim 10 can also have on its bed 13 a positive engagement portion 31 in the circumferential direction of regenerating positive engagement with the emergency ring 1. A plurality of recesses 32 can further be provided on the emergency ring 1 so as to be distributed over its circumference and extending transversely to the circumferential direction.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An emergency ring for a vehicle wheel which is composed of a one-piece rim with a rim bed and a pneumatic tire, comprising a one-piece annular elastic body having annular reinforcement inlays and a radially outside portion on which, in an emergency, a radially inside portion of the pneumatic tire remote from tire tread comes to rest, an axially outer side face, axially an inner side face, and a radially inside portion oriented toward the rim bed, wherein the radially inside portion of the emergency ring is supported by at least a part of a surface thereof on the rim bed, and at least one of the axially outer and inner side faces is spaced apart from an adjacent side wall region of the pneumatic tire.

2. The emergency ring of claim 1, in which the rim is a one-piece deep bed rim, and the radially inside of the emergency ring is supported by at least a portion of a surface thereof in the bed of the rim.

3. The emergency ring of claim 1, wherein the radially inside portion of the emergency ring has two annular bearing regions for supporting the ring on the rim bed.

4. The emergency ring of claim 1, wherein the axially outer and inner side faces are curved, and the at least one of the axially inner and outer side faces has a contour similar to a contour of the adjacent side wall region.

5. The emergency ring of claim 1, wherein a spacing of the radially outer side face from an outer hump region of the rim is no greater than a width of an outer tire bead of the pneumatic tire.

6. The emergency ring of claim 1, wherein a width of the emergency ring in a mounted, unloaded condition is substantially equal to a rim opening width reduced by from 0.5 to 2 times the tire bead thickness.

7. The emergency ring of claim 6, wherein a spacing of the radially outer side face from an outer hump region of the rim is no greater than a width of an outer tire bead of the pneumatic tire.

8. The emergency ring of claim 1, wherein a height of the mounted, unloaded emergency ring in a mounted, unloaded condition is about half a tire height.

9. The emergency ring of claim 8, wherein a spacing of the radially outer side face from an outer hump region of the rim is no greater than a width of an outer tire bead of the pneumatic tire.

10. The emergency ring of claim 9, wherein a width of the emergency ring in a mounted, unloaded condition is substantially equal to a rim opening width reduced by from 0.5 to 2 times the tire bead thickness.

11. The emergency ring of claim 1, wherein a diameter of the reinforcement inlays is only slightly greater than a wheel flange diameter.

12. The emergency ring of claim 11, wherein a spacing of the radially outer side face from an outer hump region of the rim is no greater than a width of an outer tire bead of the pneumatic tire.

13. The emergency ring of claim 12, wherein a width of the emergency ring in a mounted, unloaded condition is substantially equal to a rim opening width reduced by from 0.5 to 2 times the tire bead thickness.

14. The emergency ring of claim 13, wherein a height of the mounted, unloaded emergency ring in a mounted, unloaded condition is about half a tire height.

15. The emergency ring of claim 1, wherein the center of gravity of the emergency ring in a mounted, unloaded condition is located in an axial direction near a center plane of the rim.

16. The emergency ring of claim 1, wherein at least one of the emergency ring on an inside thereof and the bed are configured to generate positive engagement in the circumferential direction.

17. The emergency ring of claim 1, wherein the bed of the rim is configured, at least intermittently in the circumferential direction, to generate positive engagement in an axial direction with the emergency ring.

18. The emergency ring of claim 1, wherein the emergency ring on an outside thereof has a plurality of circumferentially distributed recesses extending transversely to a circumferential direction.

* * * * *